United States Patent [19]
Sherk

[11] 3,917,882
[45] Nov. 4, 1975

[54] METHOD FOR APPLYING A DIELECTRIC GLASS TO A GLASS SUBSTRATE

[75] Inventor: Thomas A. Sherk, West Hurley, N.Y.

[73] Assignee: International Business Machines Corporation, Armonk, N.Y.

[22] Filed: June 24, 1974

[21] Appl. No.: 482,678

[52] U.S. Cl. ............... 427/108; 427/109; 427/110; 427/376; 427/377; 427/378; 427/379; 427/380
[51] Int. Cl.² ...................... B05D 5/12; B05D 3/02
[58] Field of Search ........ 65/18; 117/169 A, 124 A, 117/211, 62; 427/108, 376, 377, 378, 379, 380; 428/428

[56] References Cited
UNITED STATES PATENTS

| | | | |
|---|---|---|---|
| 3,428,475 | 2/1969 | Teeg | 117/124 A |
| 3,434,817 | 3/1969 | Hazdra | 117/124 A |
| 3,850,687 | 11/1974 | Kern | 117/169 A |

Primary Examiner—Michael F. Esposito
Attorney, Agent, or Firm—Edward S. Gershuny

[57] ABSTRACT

A method of applying a dielectric glass to a glass substrate comprising the steps of (1) coating the dielectric onto the substrate, (2) reflowing the dielectric in an ambient of wet oxygen, and (3) soaking the dielectric in dry oxygen.

8 Claims, 2 Drawing Figures

METHOD FOR APPLYING A DIELECTRIC GLASS TO A GLASS SUBSTRATE

BACKGROUND OF THE INVENTION

This invention relates to a method for applying a dielectric glass to a glass substrate. More particularly, the invention relates to a novel method which is particularly suited for use in the manufacture of gas panel displays.

Plates used in manufacturing a gas display panel contain a dielectric layer with a magnesium oxide overcoat. In the prior art, during the step of sealing plates together, the magnesium oxide overcoat layer had a tendency to craze (develop small cracks). This is, of course, undesirable.

One solution to the crazing problem is presented in copending application Ser. No. 374,189, filed June 27, 1974 by T. A. Sherk and R. R. Tummala, and assigned to International Business Machines Corporation. That application, which is incorporated herein by this reference, describes a family of dielectric glasses having such properties that, when heat is applied to seal plates together, there will be no crazing in a magnesium oxide overcoat.

It is an object of this invention to provide an improved method for applying a dielectric glass to a glass substrate.

It is a more particular object of the invention to provide a method which will alleviate the crazing problem described above.

Another object of the invention is to provide such a process which is particularly useful for applying any of a family of PbO — $B_2O_3$ — $SiO_2$ dielectric glasses.

SUMMARY OF THE INVENTION

The above and other objects are achieved in accordance with a preferred embodiment of the invention by providing a method for the application of a dielectric glass to a glass substrate comprising the steps of (1) coating the dielectric onto the substrate, (2) reflowing the dielectric in an ambient of wet oxygen, and (3) soaking the dielectric in dry oxygen. Preferred dielectrics have substantially the following constituents:

|  | % by weight |
|---|---|
| PbO | 63–70 |
| $SiO_2$ | 5–30 |
| $B_2O_3$ | 5–30 |
| MgO | 0–10 |
| CaO | 0–10 |
| $Al_2O_3$ | 0–0.2 |

The primary advantage of this invention is that, refractory dielectric glasses can be satisfactorily applied using the method described herein, thereby lessening any tendency of a magnesium oxide overcoat layer to craze. This is of particular advantage in vitreous sealing technology which typically utilizes temperatures of approximately 470°–480°C for sealing glass plates together. Such sealing temperatures will not cause crazing of a magnesium oxide overcoat layer if a suitably refractory dielectric glass has been applied in accordance with this invention.

The foregoing and other objects, features and advantages of the invention will be apparent from the following more particular description of a preferred embodiment as illustrated in the accompanying drawings.

DETAILED DESCRIPTION

Figure 1:
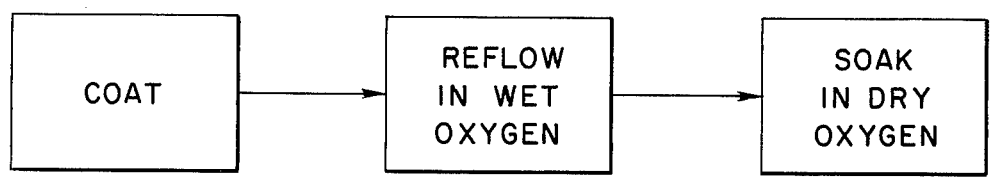
FIG. 1 is a diagram illustrating the sequence of steps in the novel method.

As is indicated in FIG. 1, the method of this invention involves three essential steps: (1) coating the dielectric glass onto the substrate; (2) reflowing the dielectric in wet oxygen; and (3) soaking the dielectric in dry oxygen.

It must be noted that the term "coat" as used herein, with respect to the first step in the process, is intended merely to mean that the dielectric glass is placed in some convenient manner on the glass substrate. For example, the "coating" step could be accomplished by placing a powdered dielectric frit upon the substrate; or it could be accomplished by placing small pieces of the dielectric upon the substrate; or by any other convenient means. Various techniques for accomplishing this first step in the process are well known to those skilled in the art and need not be described herein.

The second step in this process is to reflow the dielectric in an ambient of wet oxygen. This will eliminate bubbles in the dielectric film, and the wet oxygen serves to reduce the viscosity and surface tension of the dielectric, thereby making it possible to reflow a more refractory dielectric glass than would be attained in an air ambient. If the dielectric is selected from one of the examples given below, the wet oxygen reflow step should preferably utilize a temperature between approximately 550° and 630°C for a period of between approximately one half and 2 hours at atmospheric pressure, and the oxygen should have a dew point of at least 25°C. Higher dew point oxygen, up to about 90°C, can be used for the reflow step. This will increase the effectiveness of bubble release.

The third step of the process is a soak period in dry oxygen in order, primarily, to partially remove OH groups from the glass. This is necessary because the water content of the dielectric glass would tend to lower both the electrical resistivity of the dielectric and the temperature at which a magnesium oxide overcoat would tend to craze. If the dielectric is selected from one of the examples given below, the dry oxygen soak step should preferably utilize a temperature between approximately 550° and 630°C for a period of between approximately one half and 2 hours at atmospheric pressure, and a dew point of less than −40°C.

Figure 2:
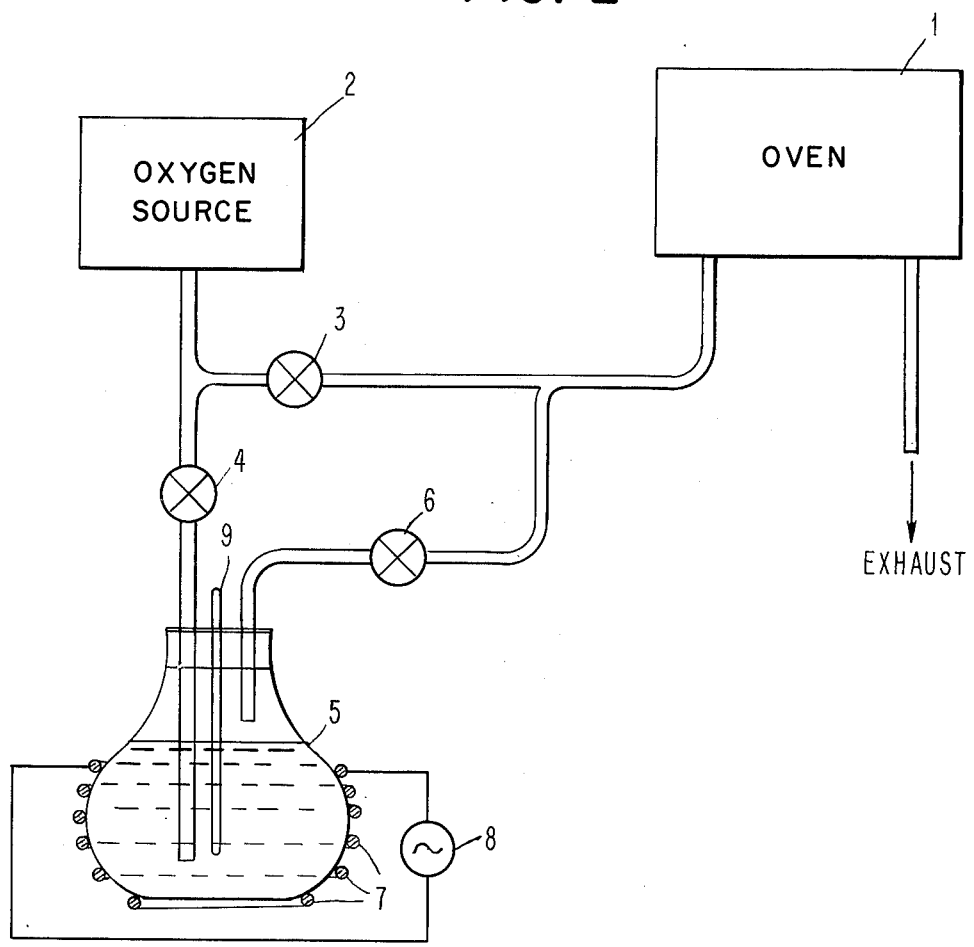
FIG. 2 shows apparatus which may be used in the second and third steps of the method.

Referring to FIG. 2, there is shown one form of apparatus which may be used to practice the second and third steps of this method. The apparatus includes an oven 1 through which gaseous ambients may be passed. A source of oxygen 2 can supply dry oxygen to the oven 1 through a valve 3, or it can supply wet oxygen to the oven through valve 4, saturator 5 and valve 6. Surrounding the saturator are heating elements 7 which receive power from an electric source 8. A thermometer 9 is used to monitor the temperature of the water in the saturator.

If apparatus similar to that shown in FIG. 2 were to be used in practicing the method of this invention, the reflow step would be accomplished as follows. The glass substrate, which has been coated with the dielectric, is placed in the oven 1. Initially, valves 3, 4 and 6 are closed. The oven is slowly brought up to the reflow temperature at a rate of approximately 120°C per hour. During heating, when the furnace temperature exceeds 200°C, valves 4 and 6 will be opened, allowing oxygen to pass from the source 2 through the saturator 5 and through the oven 1. The wet oxygen is not introduced into the oven until this time in order to avoid condensation problems. Elevation of the oven temperature will continue until a temperature between approximately 550° and 630°C is reached, and this temperature will be maintained for a period of approximately one half to 2 hours. A continuous flow of wet oxygen, having a dew point of at least approximately 25°C, is maintained during the reflow step. In one preferred implementation of this method, the reflow step utilizes an oven temperature, time period and dew point of approximately 620°C, 45 minutes and 25°C, respectively.

After the reflow step has been completed, valves 3 and 4 will be closed and valve 6 will be opened to purge the oven 1 with dry oxygen from the source 2. A soak period of approximately one half to 2 hours will then take place, preferably at the same temperature that was used for the reflow step. A flow of dry oxygen is maintained during the soak period. In one preferred implementation of this method, the soak step utilizes an oven temperature, time period and dew point of approximately 620°C, 45 minutes and −40°C, respectively. After soaking has been completed, all valves will be closed and the oven will be slowly cooled to approximately room temperature at a rate of approximately 120°C per hour, at which time the glass substrate with its deposited dielectric coating may be removed.

Many different types of dielectric glasses may be advantageously used when practicing this method. A preferred family of dielectrics have substantially the following constituents:

|  | % by weight |
|---|---|
| PbO | 63–70 |
| $SiO_2$ | 5–30 |
| $B_2O_3$ | 5–30 |
| MgO | 0–10 |
| CaO | 0–10 |
| $Al_2O_3$ | 0–0.2 |

In order that the dielectric be capable of proper reflow in the wet oxygen ambient, it is preferable that no alumina be present in its composition. However, as indicated above, small amounts of alumina, up to approximately 0.2% by weight, will generally be acceptable.

Seven specific examples of dielectric glass compositions which may be advantageously utilized in the method of this invention have substantially the following constituents in the following proportions:

| | % by weight | | | | | | |
|---|---|---|---|---|---|---|---|
| | I | II | III | IV | V | VI | VII |
| PbO | 69 | 68.3 | 69 | 68 | 66 | 66.7 | 67 |
| $SiO_2$ | 22 | 21.7 | 20 | 16 | 18 | 23.3 | 20 |
| $B_2O_3$ | 9 | 10 | 11 | 16 | 10 | 10 | 10 |
| MgO | | | | | 6 | | 3 |

When this method is used in a process of manufacturing a gas panel display, the glass substrate upon which the dielectric is deposited will typically be a soda-lime-silica float glass.

Although the above description refers to the use of an oxygen ambient in both the (wet) reflow and (dry) soak steps, those skilled in the art will recognize that traces of various other gases could be present without significant adverse effects. For example, a substantial amount of nitrogen (perhaps as much as 10–20% by volume) would still be acceptable.

While the invention has been particularly shown and described with reference to a preferred embodiment thereof, it will be understood by those skilled in the art that the above and other changes in form and details may be made therein without departing from the spirit and scope of the invention.

What is claimed is:

1. A method for applying a dielectric glass which contains no more than approximately 0.2% by weight $AL_2O_3$ to a glass substrate, comprising the following steps in the following sequence:
   a. coating the dielectric onto the substrate;
   b. reflowing the dielectric by heating it in an ambient of wet oxygen having a dew point within the range of approximately 25° to 90°C; and
   c. soaking the dielectric by heating it in an ambient of dry gaseous oxygen having a dew point below approximately −40°C.

2. The method of claim 1 wherein the oxygen ambient used in said reflowing step (b) has a dew point of approximately 25°C.

3. The method of claim 1 wherein
   said reflowing step takes place within a temperature range of approximately 550° to 630°C for a period of approximately one half to 2 hours; and
   said soaking step takes place within a temperature range of approximately 550° to 630°C for a period of approximately one half to 2 hours.

4. The method of claim 3 wherein
   said reflowing temperature and period are approximately 620°C and 45 minutes, respectively; and
   said soaking temperature and period are approximately 620°C and 45 minutes, respectively.

5. The method of claim 4 wherein the oxygen ambient used in said reflowing step (b) has a dew point of approximately 25°C.

6. A method for applying a dielectric glass containing PbO, $SiO_2$, $B_2O_3$ and no more than approximately 0.2% by weight $AL_2O_3$ to a glass substrate, comprising the following steps in the following sequence:
   a. coating the dielectric onto the substrate;
   b. reflowing the dielectric in an ambient that has a dew point within the range of approximately 25°C to 90°C at a temperature within a range of approximately 550° to 630°C for a period of approximately one half to 2 hours; and
   c. soaking the dielectric in an ambient of dry oxygen having a dew point below approximately −40°C at a temperature within a range of approximately 550° to 630°C for a period of approximately one half to 2 hours.

7. The method of claim 6 wherein
   said reflowing temperature and period are approximately 620°C and 45 minutes, respectively; and
   said soaking temperature and period are approximately 620°C and 45 minutes, respectively.

8. The method of claim 7 wherein the oxygen ambient used in said reflowing step (b) has a dew point of approximately 25°C.

* * * * *